United States Patent [19]

Yuhasz et al.

[11] 4,332,145
[45] Jun. 1, 1982

[54] SYSTEM FOR MAKING FROZEN FOOD ARTICLE

[76] Inventors: Joseph M. Yuhasz, 6356 Busch Dr., Malibu, Calif. 90265; Sean A. O'Brien, 1959 Selby Ave., Los Angeles, Calif. 90025

[21] Appl. No.: 232,645

[22] Filed: Feb. 9, 1981

[51] Int. Cl.³ .............................................. A23G 9/00
[52] U.S. Cl. ......................................... 62/342; 62/435
[58] Field of Search ................ 62/342, 343, 435, 438; 137/563

[56] References Cited

U.S. PATENT DOCUMENTS

| | | | |
|---|---|---|---|
| 1,495,125 | 5/1924 | Willmann | 62/342 X |
| 1,701,764 | 2/1929 | Roebuck | 259/DIG. 34 X |
| 2,058,098 | 10/1936 | O'Neil et al. | 62/167 |
| 2,577,916 | 12/1951 | Rollman | 259/DIG. 34 X |
| 3,400,551 | 9/1968 | Booth et al. | 62/343 X |
| 3,794,242 | 2/1974 | Hagdorn et al. | 237/66 X |
| 3,828,572 | 8/1974 | Calim | 62/342 X |
| 3,958,428 | 5/1976 | Kelso | 62/342 X |

Primary Examiner—William E. Tapolcai, Jr.
Attorney, Agent, or Firm—Allan M. Shapiro

[57] ABSTRACT

System for making frozen food article comprises a refrigeration source of high capacity, a food-freezing chamber normally maintained at ambient temperature and of low thermal capacity, a source of food or vegetable juice or puree for freezing, and a controller. The controller controls the refrigeration source to maintain an adequate supply of chilled coolant, controls the discharge of the coolant liquid to a coolant jacket around the frozen food chamber for rapid chilling, controls the discharge of food material to the chamber, controls the beating of the food material while it is freezing, and finally controls the discharge of the resultant beaten frozen food article into a receiving cup.

7 Claims, 3 Drawing Figures

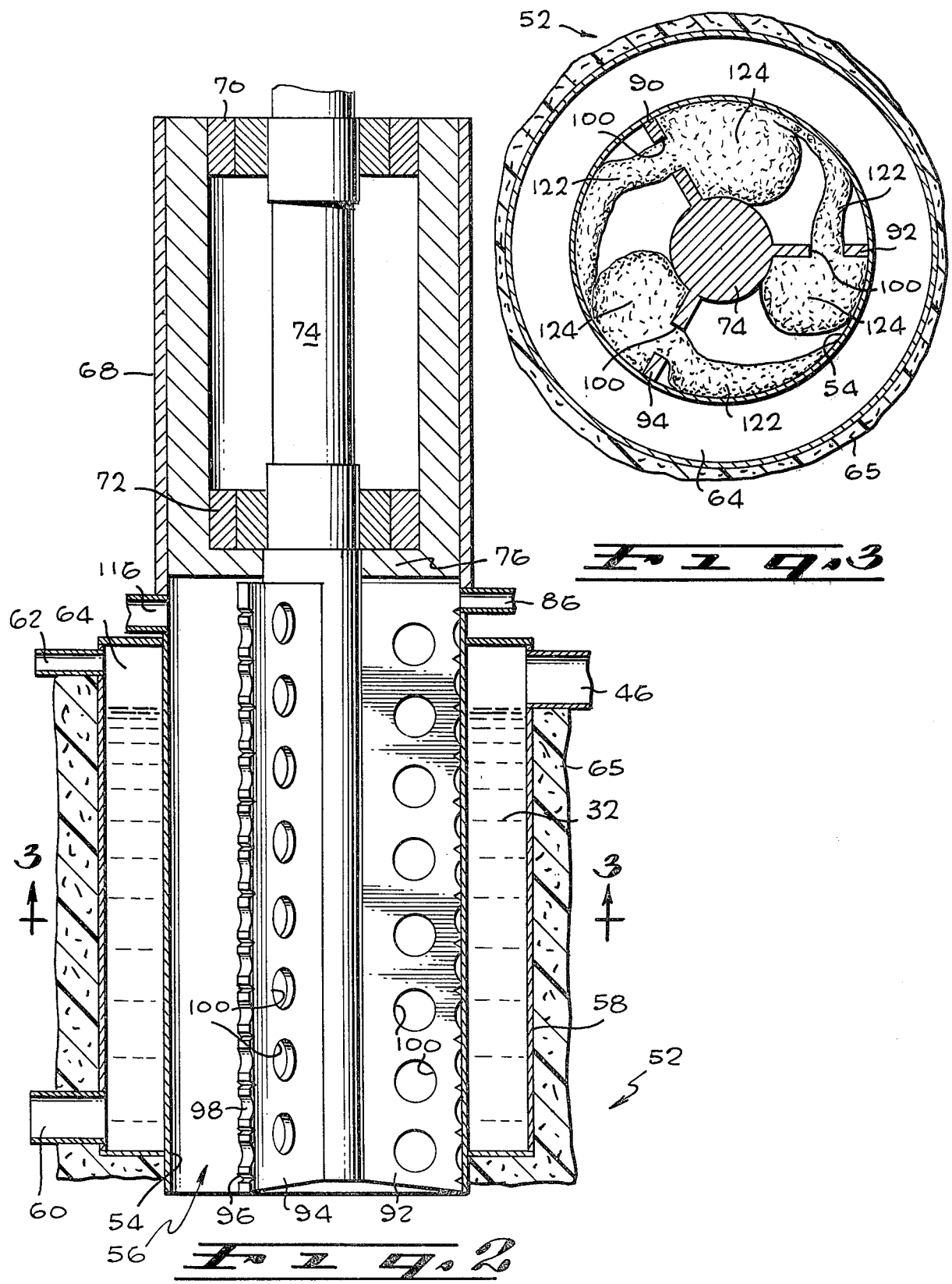

SYSTEM FOR MAKING FROZEN FOOD ARTICLE

BACKGROUND OF THE INVENTION

1. Field of the Invention

This invention is directed to a system for making a frozen food article and particularly a system which is sufficiently completely automated that no operator skills are required, and it is adaptable to coin operation.

2. Brief Description of the Prior Art

The conventional freezing device comprises a compressor for compressing a refrigerant gas which is then condensed into a liquid which is expanded to a lower pressure so that it evaporates taking up heat to cause refrigeration. The expanding refrigerant is usually in direct thermal communication with the material to be chilled so that cooling rate of the material to be chilled is limited by the steady state operation of the compressor. In some cases, a coolant is cooled by the expanding refrigerant gas. Submerged in the cooled liquid are containers which contain food material which is to be frozen. Spreen U.S. Pat. No. 1,764,653 shows a structure of this nature. In O'Neil U.S. Pat. No. 2,058,098, the expanding refrigerant cools beverage liquid so that, upon demand, a cooled beverage can be dispensed. Palmer U.S. Pat. No. 3,041,852 shows a compressor and evaporator which are contained in one unit and a separate container which receives the evaporating coolant to cool an article contained therein. This prior art is not directly pertinent, but it is generally directed to refrigeration systems for food materials. Ash U.S. Pat. No. 2,590,061 discloses a system wherein a fluid is maintained at a relatively constant temperature for dispensing to and cooling a remote vat, but this fluid is not recirculated back to the reservoir because the fluid is not a coolant. Bright U.S. Pat. No. 2,040,828 is similar to Ash, and its fermentation tank is substantially greater in volumetric capacity than the capacity of the cooling apparatus. Furthermore, while Haley U.S. Pat. No. 2,720,084 employs separate refrigeration for chilling a circulating coolant, the coolant is for air-conditioning service, and there is no teaching of a particular type of food-freezing chamber.

SUMMARY OF THE INVENTION

This invention is directed to a system for making a frozen food article, and particularly a system which includes a cooling system of high refrigeration capacity, a beating and mixing chamber of low thermal capacity, a food material supply, and a controller for controlling the various parts of the system so that a frozen food article is produced without requiring operator skills.

It is thus an object of this invention to provide an integrated system whereby a frozen food article can be produced. It is another object to provide a system which is sufficiently automated that it can be arranged to be operated by a simple switch or by a coin acceptor so that a frozen food article can be obtained on demand. It is another object to provide a system for making a frozen food article which includes a refrigeration source of high thermal capacity and a food-freezing and beating chamber of low thermal capacity so that the chamber can be maintained at ambient until it is required for chilling and thereupon quickly cooled down, the cooling being achieved by demand and controlled by the control unit.

The features of the present invention which are believed to be novel are set forth with particularity in the appended claims. The present invention, both as to its organization and manner of operation, and together with further objects and advantages thereof may be understood best by reference to the following description taken in connection with the accompanying drawings.

BRIEF DESCRIPTION OF THE DRAWINGS

FIG. 2 is a longitudinal section through the food-freezing chamber showing the beater therein in side elevation and showing the chilling coolant jacket therearound.

FIG. 3 is a section taken generally along the line 3—3 of FIG. 2.

DESCRIPTION OF THE PREFERRED EMBODIMENT

Figure 1:
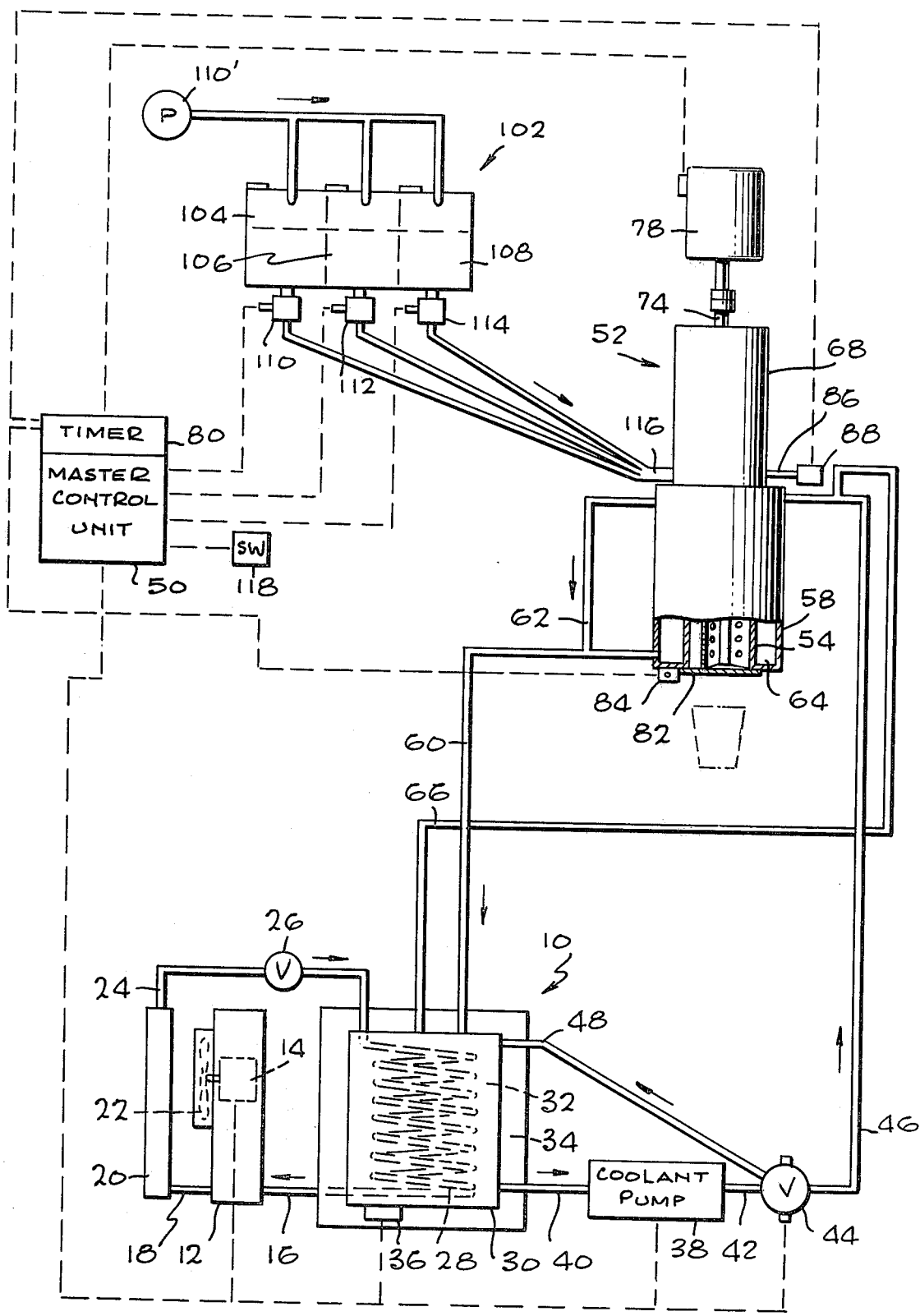
FIG. 1 is a side elevational view of several components of the apparatus of the invention somewhat schematically shown with parts broken away and parts shown in section together with a schematic layout of the control system whereby the system is controlled.

Refrigeration for making the frozen food article is achieved by cooler 10. Compressor 12 is driven by motor 14 and draws refrigerant vapor from line 16. It delivers high pressure refrigerant gas at line 18 to condenser 20. The high pressure refrigerant vapor is condensed to a liquid giving off heat. Fan 22 is driven by motor 14 and delivers air across condenser 20 so that the heat is rejected to the atmosphere. Refrigerant liquid is delivered by line 24 to expansion valve 26 which expands the high pressure liquid to low pressure causing evaporation in cooling coil 28. Suction line 16 is connected to cooling coil 28 so that the refrigerant is in the closed system. The usual freons provide a satisfactory system.

Cooling coil 28 is in coolant tank 30. Coolant 32 substantially fills the tank and extends almost to the top thereof leaving a small air space at the top. The top of the tank is closed to minimize both thermal and evaporation losses. Insulation 34 surrounds coolant tank 30 to minimize thermal losses. The line from expansion valve 26 to cooling coil 28 and the suction line 16 from the bottom of cooling coil 28 to the suction of the compressor are both preferably insulated also to minimize thermal losses. Temperature sensor 36 senses the temperature of the coolant in the tank.

Coolant-circulating pump 38 draws suction through line 40 and delivers circulating coolant at line 42. Three-way valve 44 can be operated to deliver to the coolant out through delivery line 46 or through recirculating line 48. In standby operation, valve 44 is directed so that recirculating line 48 receives the coolant pumped by pump 38. Refrigerator compressor 12, sensor 36, coolant pump 38, and control valve 44 are all connected to master control unit 50 which controls the cycling of the entire system. Coolant pump 38 is operated on a sufficient cycle to prevent stratification of coolant 32 in coolant tank 30 to keep the coolant pump, its lines and valve 44 cooled and thus ready to deliver coolant in delivery line 46 as required.

The range of temperature suitable for coolant 32 in coolant tank 30 is from 0 degrees F. to 25 degrees F. below zero. For these purposes, a coolant mixture of half ethylene glycol and half water is useful. Compressor 12 is cycled, and valve 26 is operated to maintain the desired temperature of coolant 32. For example, pressure operated expansion valve 26 would be satisfactory with temperature sensor 36 establishing the on-cycle of compressor 12. The temperature at line 40 could be sensed to control the cycling of pump 38, if desired. Coolant pump 38 is positioned exteriorly of coolant tank 30 to permit maintenance thereof, and it is preferably sufficiently low that gravitational priming of the pump is achieved. Furthermore, the pump, valve 44, and the associated lines are preferably insulated to minimize thermal loss.

Freezer 52, shown in the system in FIG. 1 and shown in more detail in FIGS. 2 and 3, has as its principal part tube 54 which defines freezing chamber 56 in its interior. Surrounding chamber 56 is cooling jacket 58 which is connected to line 46 and contains coolant 32 when cycled. Return line 60 returns coolant 32 to the interior of coolant tank 30. Bleed line 62 bleeds the top of coolant jacket 58 back to tank 30 so that, when valve 44 is opened in a direction to deliver coolant 32 up delivery line 46, the air which might otherwise be trapped in the top of coolant space 64 is delivered out of bleed line 62 back to the interior of tank 30. Since the total amount of liquid and total amount of air in the lines and the interior of tank 30 and the interior of coolant jacket 58 are constant, the air thus returned to tank 30 takes up the space of coolant which was transferred from tank 30 to fill jacket 58. Thus, upon actuation of valve 44, coolant quickly fills coolant space 64 to quickly chill tube 54 which serves as the wall of freezing chamber 56. Tube 54 is maintained as thin as practical in order to minimize the thermal capacity of the system. Insulation 65 around the jacket and appropriate parts of the freezing chamber aids in limiting thermal loss.

At the end of the freezing cycle, it is desirable that all coolant return to tank 30. In order to achieve this, vent line 66 is connected from the air space at the top of tank 30 to the highest point of the coolant system (in the present instance, where delivery line 46 enters the coolant jacket). Thus, with closing of valve 44, air vents via line 66 to the top of the system while the coolant liquid in coolant jacket 58 and return line 60 drains back into coolant tank 30.

Bearing housing 68 is mounted on the top of tube 54. It contains bearings 70 and 72 which rotatably support shaft 74 therein. Wall 76 closes the top of freezing chamber 56, and shaft 74 extends downwardly through wall 76 into the freezing chamber to terminate adjacent the bottom thereof. The top of shaft 74 carries motor 78 which rotates the shaft when the motor is energized. The motor is controlled by master control unit 50 through timer 80 which forms part of the control system.

The lower end of freezing chamber 56 can be closed by hatch 82 (see FIG. 1) which is controlled by motor 84. Motor 84 is a solenoid or rotary motor which controls the opening and closing of the hatch. Motor 84 is controlled by timer 80. When hatch 82 is in its closed position shown in FIG. 1, the freezing chamber is totally closed, so that upon the introduction of food thereto, air must be discharged. Vent 86 is controlled by solenoid valve 88. The valve is also controlled from timer 80 so that, when food is introduced into the freezing chamber 56, displaced air can be vented out of vent 86.

Beater blades 90, 92 and 94 are equally spaced around shaft 74 and are secured to the lower portion thereof. They occupy nearly the entire space within freezing chamber 56 and nearly touch top wall 76, hatch 82, and the freezing wall of tube 54. A clearance of 0.002 to 0.003 inch in each of these places is satisfactory, although more clearance can be tolerated at the ends, and there is preferably less clearance between the beater blades and the tube wall.

The scraping edge of the beater blades is provided with a screwthread. The screwthread has preferably two starts with a net pitch of 5 threads to the axial inch and is cut 0.062 inch deep along the edges of the blade. Thread start 96 has a standard 60 degree V. Thread start 98 has a curved bottom (again to 0.062 inch deep) but, instead of being V-shaped, it has a 0.120 radius. The effect of these threads is that the angular action forces the product downward, while the radius thread 98 allows a greater portion of the product to come into contact with the wall of the freezing chamber to produce efficient freezing. Each beater blade has a series of holes 100 therein. For a beater chamber of 2.50 inches diameter and 5.25 inches long, 8 holes 100 of ⅜ inch diameter along each of the beater blades set at 3/16 inch from the cutting edge of each blade is suitable. These holes are placed along the blade so that each hole overlaps with, but is not directly in the line with, the hole on the preceding blade.

FIG. 1 illustrates the food-dispensing unit 102. Reservoirs 104, 106 and 108 each contain liquid food material. The food material can be selected from fruits or vegetables and can be juice or a puree of pulp and juice. A wide variety of foods can be employed. Juices of tree fruits, berries, and other fruits, as well as vegetable juices, and purees of fruits and vegetables are suitable materials to serve as liquid starting material for the present food article. Selected food material liquids are placed in the reservoirs. Three reservoirs are employed so that selection of the character of the resultant frozen food article can be made. The three reservoirs are suitably closed and are pressurized by air pump 110'. The outlets of the three reservoirs are selectively controlled by solenoid valves 110, 112 and 114 which, in turn, are controlled from the master control unit 50. Each of these valves has its outlet discharge to liquid food material inlet 116 into freezing chamber 56. Agitation can be provided in the reservoirs, if such is necessary to maintain the juices or purees in appropriate suspension.

In standby operation, compressor 12 cycles as necessary to maintain coolant 32 at the desired temperature (preferably 10 degrees F. below Zero) as detected by sensor 36. Coolant pump 38 is cycled often enough to prevent stratification of the coolant in tank 30 and to maintain pump 38 and associated parts chilled. In this recirculating condition, valve 44 is positioned to direct the recirculating liquid back through recirculating line 48. In the standby condition, hatch 82 may be opened to maintain the freezing chamber 56 in the ventilated condition, but is preferably closed to maintain cleanliness.

In order to start the cycle, first the flavor selector on master control unit 50 is actuated to the desired flavor. Next, switch 118 is operated to start the cycle. Switch 118 may be a manual switch, or it may be a part of a coin acceptor so that the system can be a coin-operated system. First, if hatch 82 is open, it is closed by its controller 84. Next, the selected solenoid valve 110, 112 or 114 is opened to allow a measured amount of liquid food material to be discharged into freezing chamber 56. The liquid food material is propelled by the air pressure in its reservoir. Valve 88 opens vent line 86 during the filling operation. Simultaneously with the start of filling, valve 44 is actuated so that coolant is delivered to coolant space 64. At the same time, coolant pump 38 is actuated to remain on independent of the recirculating requirements.

Next, about 2 to 3 seconds later, the master control unit starts motor 78 to actuate the beaters causing the liquid food material to be mixed and whipped as it freezes on the chamber walls. The amount of liquid food material forced into the freezing chamber is a time function so that, when the proper time is elapsed, the liquid food material control valve is turned off and, at the same time, vent 86 is closed. About 4 ounces of liquid food material is discharged into the freezing chamber which has a capacity of about 13 fluid ounces. With the beater operating and the walls in the freezing chamber below the freezing point of the liquid food material, liquid is thrown against the walls to freeze. The effect of the staggered holes 100 in the beater blades is that the product being frozen is constantly being beaten, exchanged, and evenly distributed throughout each of the three compartments between the three beater blades. This even distribution of the product prevents vibration of the product being frozen. Furthermore, as the product is being frozen, it is forced through the holes 100 in a relatively tubular fashion as indicated at 122 and then forms a vertical cylinder of frozen food as indicated at 124, along the leading edge of blade. This cylinder 124 is constantly turning and picks up the frozen food product from the walls of the chamber which were left by the threads in the edges of the beater and the tubular-type trailings 122 left by the holes 100 in the preceding blades. The result is a uniformly smooth frozen product with very fine crystallization.

This configuration of the holes mixes air from the freezing chamber into the liquid and crystalline ingredients producing a light, fluffy frozen food article. This override aeration of the structure provides a lighter, smoother frozen food article. The override is the difference in volume (the output volume minus the input volume) so that a full measure is provided.

After an appropriate length of time (depending on the amount of liquid food material and the cooling capacity, and in the preferred embodiment disclosed after about 55 seconds), controller 84 opens hatch 82 to dispense the frozen food article into cup 120. At the same time, valve 44 is returned to its recirculation position, all coolant fluid 32 is returned to tank 30, leaving chamber 56 empty, ready for the next cycle, and coolant pump 38 is returned to demand control. After an appropriate length of time after the dispensing of the product, the beater motor is turned off and the hatch 82 is closed so that the system is ready for the next cycle. The system is in standby condition ready to quickly produce another frozen food article; however, in the standby condition, no rime ice is formed in the freezing chamber to dilute subsequent articles or to cause freeze-up of beater blades to cylinder wall.

This invention having been described in its preferred embodiment, it is clear that is is susceptible to numerous modifications and embodiments within the ability of those skilled in the art and without the exercise of the inventive faculty. Accordingly, the scope of this invention is defined by the scope of the following claims.

What is claimed is:

1. A system for making a frozen food article, said system comprising:

a cooler for providing a quantity of chilled liquid coolant and for circulating the coolant;

a freezer having a freezing chamber and a liquid coolant jacket extending around at least part of said freezing chamber, said coolant jacket being positioned above said cooler;

the thermal capacity of said cooler being larger than the thermal capacity of said freezer;

means for selectively directing liquid coolant from said cooler into said cooling jacket on said freezer;

said cooler having a closed coolant tank;

an airbleed line connected from adjacent the top of said jacket to bleed air from said jacket during filling of said jacket with liquid coolant so that said jacket quickly fills with liquid coolant, said bleed line being connected to discharge air from said jacket to said coolant tank; and means for introducing liquid food product into said chamber for freezing in said chamber and means for beating said food material in said freezing chamber so that a beaten frozen food article is formed in said chamber.

2. A system for making a frozen food article, said system comprising:

a cooler for providing a quantity of chilled liquid coolant and for circulating the coolant;

a freezer having a freezing chamber and a liquid coolant jacket extending around at least part of said freezing chamber, said coolant jacket being positioned above said cooler;

the thermal capacity of said cooler being larger than the thermal capacity of said freezer;

means for selectively directing liquid coolant from said cooler into said cooling jacket on said freezer;

a vent line connected to vent air into said jacket upon termination of circulation of coolant to said jacket in order to permit gravitational return of coolant from said jacket to said cooler;

means for introducing liquid food product into said chamber for freezing in said chamber and means for beating said food material in said freezing chamber so that a beaten frozen food article is formed in said chamber.

3. The system of claim 2 wherein said cooler has a closed coolant tank and further including a bleed line connected from adjacent the top of said jacket to said coolant tank to permit bleeding of air from the top of said jacket to said coolant tank when liquid coolant is being introduced into said jacket.

4. The system of claim 2 wherein said freezing chamber is a cylindrical freezing chamber positioned with a substantially upright axis and having a movable hatch to selectively close the bottom thereof.

5. The system of claim 2 wherein said freezing chamber is a substantially cylindrical freezing chamber and is positioned with its axis in the substantially upright direction, said means for beating comprising a shaft lying on said axis and carrying beater blades thereon, said beater blades having edges substantially in contact with said freezing chamber wall, said edges of said beater blades being notched to permit some frozen material to remain on said freezing chamber walls during beating.

6. The system of claim 5 wherein said notches in said beater blades comprise alternate angular and curved notches.

7. The system of claim 5 further including holes through said beater blades to permit frozen food to pass through said holes during actuation of said beater.

* * * * *